(12) United States Patent
Fontanesi et al.

(10) Patent No.: US 12,116,988 B2
(45) Date of Patent: Oct. 15, 2024

(54) COUPLING ASSEMBLY FOR A VARIABLE DISPLACEMENT HYDRAULIC UNIT

(71) Applicant: Dana Motion Systems Italia S.R.L., Reggio Emilia (IT)

(72) Inventors: Luca Fontanesi, Reggio Emilia (IT); Alessandro Sassi, Reggio Emilia (IT); David Gambuzzi, Reggio Emilia (IT)

(73) Assignee: DANA MOTION SYSTEMS ITALIA S.R.L., Reggio Emilia (IT)

( * ) Notice: Subject to any disclaimer, the term of this patent is extended or adjusted under 35 U.S.C. 154(b) by 0 days.

(21) Appl. No.: 18/349,239

(22) Filed: Jul. 10, 2023

(65) Prior Publication Data
US 2024/0011471 A1 Jan. 11, 2024

(30) Foreign Application Priority Data
Jul. 11, 2022 (DE) .................... 20 2022 103 875.9

(51) Int. Cl.
*F04B 1/2085* (2020.01)
*F16C 19/50* (2006.01)

(52) U.S. Cl.
CPC .......... *F04B 1/2085* (2013.01); *F16C 19/502* (2013.01)

(58) Field of Classification Search
CPC .............................. F04B 1/148; F04B 1/2085
See application file for complete search history.

(56) References Cited

U.S. PATENT DOCUMENTS

| | | | | |
|---|---|---|---|---|
| 4,029,367 A * | 6/1977 | Schwede | ............... | F16C 33/306 384/2 |
| 4,627,330 A * | 12/1986 | Beck, Jr. | ................. | F16C 33/48 384/576 |
| 4,918,918 A * | 4/1990 | Miki | ...................... | F04B 1/324 60/489 |
| 5,024,143 A * | 6/1991 | Schniederjan | ........ | F16C 33/306 91/506 |
| 5,383,391 A * | 1/1995 | Goade | ................... | F16C 33/306 91/499 |
| 5,390,584 A * | 2/1995 | Fritz | ...................... | F04B 1/2085 92/57 |
| 5,590,579 A * | 1/1997 | Weber | ................... | F16C 33/306 417/269 |
| 5,630,352 A * | 5/1997 | Todd | ..................... | F16C 19/502 384/2 |
| 6,027,250 A * | 2/2000 | Reubelt | ................ | F16C 33/306 384/2 |
| 7,891,285 B2 * | 2/2011 | Tanemura | .......... | F04B 27/0826 92/12.2 |

(Continued)

FOREIGN PATENT DOCUMENTS

| | | |
|---|---|---|
| DE | 102014100561 A1 | 7/2015 |
| WO | 2015154761 A1 | 10/2015 |
| WO | 2019158528 A1 | 8/2019 |

*Primary Examiner* — Thomas E Lazo
(74) *Attorney, Agent, or Firm* — Marshall & Melhorn, LLC (57) ABSTRACT

The present disclosure relates to a coupling assembly for a variable displacement hydraulic unit. The coupling assembly may have a rotatable swashplate, a swashplate bearing including a cage and a plurality of rollers mounted on the cage, a pin fixed to the swashplate, and a coupling member rotatably supported on the pin. The coupling member is configured to contact a portion of the cage to move the swashplate bearing upon rotation of the swashplate.

13 Claims, 7 Drawing Sheets

(56) References Cited

U.S. PATENT DOCUMENTS

| | | | |
|---|---|---|---|
| 2006/0110082 A1* | 5/2006 | Tvaruzek | F16C 33/46 384/2 |
| 2008/0181549 A1 | 7/2008 | Nakano et al. | |
| 2009/0110564 A1* | 4/2009 | Simon | F04B 1/2007 417/269 |
| 2013/0004342 A1* | 1/2013 | Fritz | F16C 33/4605 417/222.1 |
| 2019/0024656 A1* | 1/2019 | Bahna | F04B 1/146 |
| 2021/0010464 A1* | 1/2021 | Gambuzzi | F04B 1/2085 |

* cited by examiner

Fig. 2b

COUPLING ASSEMBLY FOR A VARIABLE DISPLACEMENT HYDRAULIC UNIT

FIELD

The present document relates to a coupling assembly for a variable displacement hydraulic unit such as a variable displacement hydraulic pump or a variable displacement hydraulic motor.

BACKGROUND

Variable displacement hydraulic units are widely used in the field of hydraulics. In the context of hydraulic units such as hydraulic pumps or motors, the term displacement refers to the volume or to the amount of liquid which the hydraulic unit may displace upon a complete turn of a portion of the hydraulic unit, such as upon a complete turn of a pump shaft or motor shaft.

Variable displacement hydraulic units such as hydraulics pumps or motors typically comprise a rotatable or tiltable swashplate for controlling the displacement of one or more pistons reciprocating within a rotating cylinder block which may be connected to a pump shaft or to a motor shaft. An example of a rotatable or tiltable swashplate is the cradle-type swashplate provided in a housing. For instance, an arcuate swashplate bearing rotatably supporting the swashplate on the housing may be disposed between a convex arcuate surface of the swashplate and a concave seating surface of the housing, the swashplate bearing thereby allowing the swashplate to rotate or tilt relative to the housing. The swashplate bearing may include a cage and a plurality of rollers mounted on the cage.

For many applications it may be advantageous to adapt the size or extension of the swashplate bearing to the size or extension of the swashplate surface to be supported on the housing. For example, this may reduce the size, weight, complexity and cost of the hydraulic unit. In this case, the hydraulic unit typically further includes a coupling assembly for coupling the swashplate bearing to the swashplate in order to allow the swashplate bearing to move or rotate along with the swashplate.

An example of such a coupling assembly is described in WO 2019/158528 A1 which relates to a swashplate bearing comprising an arcuate cage member having at least one flange and a plurality of rolling elements rotatably coupled to the at least one flange. A coupling seat extends laterally from the at least on flange of the cage member, the coupling seat having an insertion hole. A link member is rotatably coupled to the cage member. The link member has a central portion positioned between a first terminal portion and a second terminal portion, wherein a first stem connects the central portion to the first terminal portion and a second stem connects the central portion to the second terminal portion. The central portion of the link member is positioned in the insertion hole.

However, there continues to be demand for a coupling assembly for a variable displacement hydraulic unit which may be produced and assembled easily and at low cost.

This problem is solved by a coupling assembly for a variable displacement hydraulic unit including the features of claim 1. Special embodiments are described in the dependent claims.

SUMMARY

The presently proposed coupling assembly for a variable displacement hydraulic unit comprises a rotatable swashplate, a swashplate bearing including a cage and a plurality of rollers mounted on the cage, a pin fixed to the swashplate, and a coupling member rotatably supported on the pin, wherein the coupling member or possibly an element rigidly connected to the coupling member is configured to contact a portion of the cage or possibly an element rigidly connected to the cage to move the cage upon rotation of the swashplate.

With respect to known coupling assemblies for variable displacement hydraulic units, the presently proposed coupling assembly may be produced and assembled in a simple and cost efficient manner.

For example, the pin may be screwed into or press-fit to the swashplate. However, other ways of fixing or connecting the pin to the swashplate are conceivable. Also, in some embodiments the pin and the swashplate may be formed in one piece.

The pin may extend or may protrude from the swashplate in parallel to a rotation axis of the swashplate. The coupling member may be translationally fixed to the pin. For example, this may include the coupling member being fixed to the pin or to the swashplate in such a way that the coupling member may not undergo translational movements relative to the pin or to the swashplate in directions perpendicular to a rotation axis of the swashplate.

The coupling assembly usually further includes a housing. The swashplate bearing may then rotatably support the swashplate on the housing. The swashplate bearing may be configured as a semi cradle bearing. A portion of the coupling member may be configured to be supported on a portion of the housing for moving the cage upon rotation of the swashplate. For instance, the housing may include or form a cutout or a recess, and a portion of the coupling member may be partially received within said cutout or recess formed in the housing.

The pin may be disposed within a plane of mirror symmetry of the swashplate. Alternatively, the pin may be disposed at a distance from a plane of mirror symmetry of the swashplate. Usually, the plane of mirror symmetry of the swashplate includes the rotation axis of the swashplate.

The coupling member may include a wire. The wire may comprise or may be made of metal. However, it is understood that the coupling assembly may be made of or may comprise other materials such as plastic, fiber glass, or the like. The wire may include a bent portion which may be rotatably supported on the pin. The bent portion of the wire may include a first loop formed by the wire and enclosing the pin. For instance, the wire may include or form one or more loops wound around the pin. The loop or loops formed by the wire and wound around the pin may rotatably connect the coupling member to the pin in a form-fit or positive fit which prevents translational movement of the coupling member relative to the pin.

The coupling member may have a first end including the bent portion of the wire and a second end. For example, the second end of the coupling member may be received in a recess or cutout formed in the housing as described above. The wire may then form two legs extending from the first end of the coupling member or from the bent portion towards the second end of the coupling member. The portion of the cage which the coupling member may be configured to contact to move the cage upon rotation of the swashplate may be disposed in between the two legs of the wire. The two legs of the wire may cross each other at least at a first crossing point between the first end of the coupling member and the second end of the coupling member. The two legs may then form an eye disposed in between the first crossing point and the second end of the coupling member. The portion of the cage which the coupling member may be configured to contact to move the cage upon rotation of the swashplate may be received within the eye formed by the two legs.

All of the rollers mounted on the cage may be disposed at equal distances from one another.

DESCRIPTION OF THE FIGURES

Embodiments of the presently proposed coupling assembly for a variable displacement hydraulic unit are described in the following detailed description and are depicted in the accompanying drawing. In the figures, FIG. 1a schematically shows a sectional view of a coupling assembly for a variable displacement hydraulic unit according to a first embodiment, wherein a swashplate is in a neutral position, FIG. 1b shows a detail of FIG. 1a, FIG. 1c schematically shows a sectional view of the coupling assembly of FIG. 1a, wherein the swashplate is in a tilted position, FIG. 1d shows a detail of FIG. 1c, FIG. 1e schematically shows a perspective view of elements of the coupling assembly of FIGS. 1a-d, FIG. 2a schematically shows a sectional view of a coupling assembly for a variable displacement hydraulic unit according to a second embodiment, wherein a swashplate is in a neutral position, and FIG. 2b schematically shows a sectional view of the coupling assembly of FIG. 2a, wherein the swashplate is in a tilted position.

DETAILED DESCRIPTION

Figure 1A:
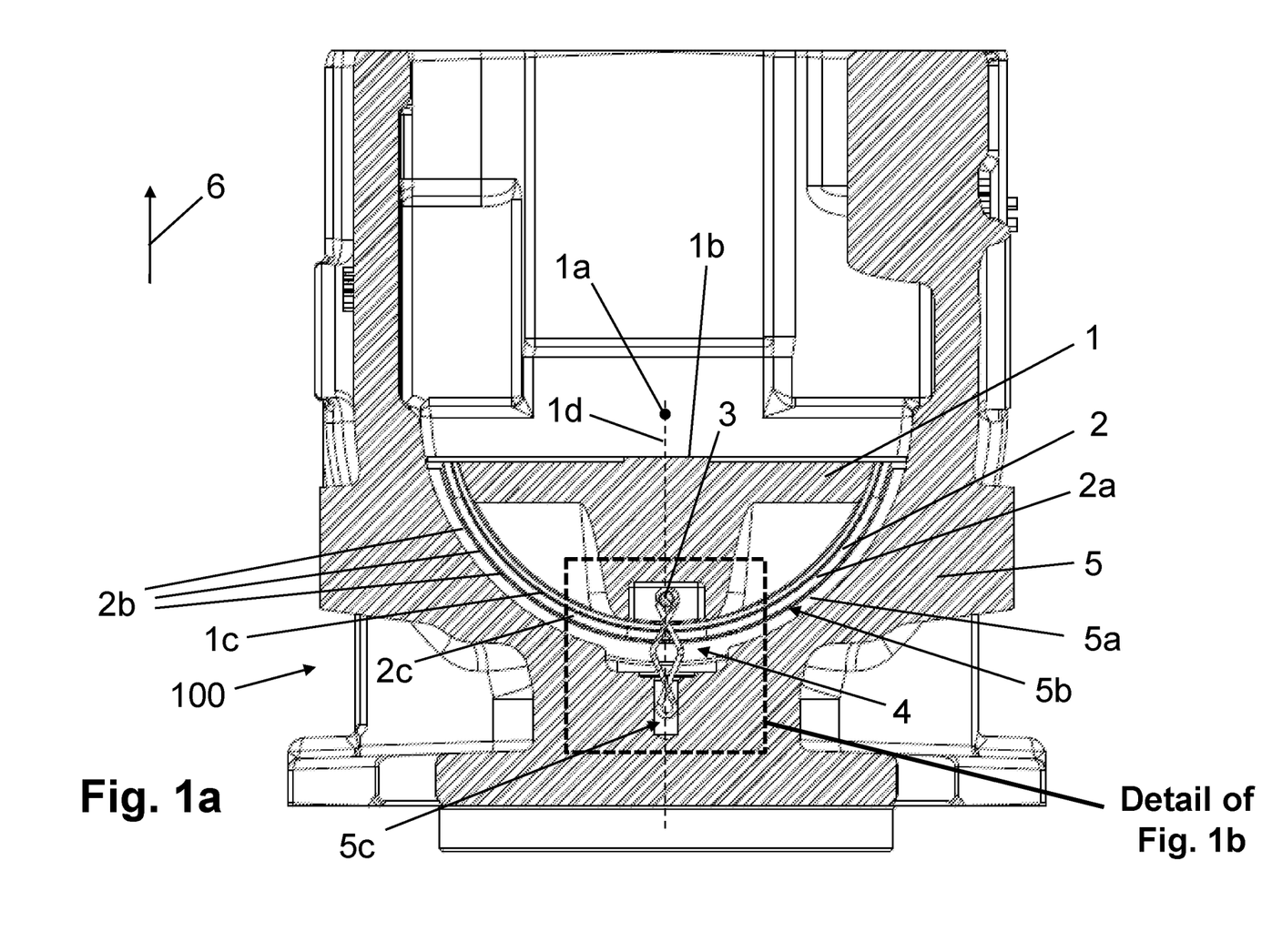

FIG. 1a illustrates a sectional view of a coupling assembly 100 in or for a variable displacement hydraulic unit such as a variable displacement hydraulic pump or a variable displacement hydraulic motor. The coupling assembly 100 includes a rotatable swashplate 1, a swashplate bearing 2, a pin 3 rigidly fixed or rigidly connected to the swashplate 1, and a coupling member 4 rotatably supported or connected to the pin 3. Here, the coupling assembly 100 further includes a housing 5. The housing 5 may be part of or may be formed in one piece with a housing of the variable displacement hydraulic unit in which the coupling assembly 100 is or may be disposed or installed. The swashplate 1 is rotatably supported on the housing 5 via the swashplate bearing 2.

The swashplate 1 is rotatable or tiltible with respect to a rotation axis 1a which runs perpendicular to the plane of projection of FIG. 1a. The swashplate 1 has a flat surface 1b and an arcuate convex surface 1c. The arcuate convex surface 1c has the shape of a section of a cylinder barrell whose symmetry axis coincides with the rotation axis 1a. Both surfaces 1a, 1 b extend in parallel to the rotation axis 1a of the swashplate 1. In the embodiment depicted here, the swashplate 1 is symmetric or essentially symmetric with respect to a symmetry plane 1d arranged perpendicular to the plane of projection of FIG. 1a. The function of the flat surface 1b of the swashplate 1 is to control the stroke of one or more pistons of the variable displacement hydraulic unit (not shown), as is generally known in the art of hydraulics. For example, the pistons of the variable displacement hydraulic unit may be received in a cylinder block which is configured to rotate with respect to a rotation axis of the hydraulic unit, wherein the rotation axis of the hydraulic unit runs in parallel to a vertical axis 6 and perpendicular to the rotation axis 1a of the swashplate 1. As the cylinder block rotates, the pistons may reciprocate in parallel to the rotation axis of the hydraulic unit, i.e. in parallel to the vertical axis 6. The stroke of the pistons may then be controlled by controlling an angle of rotation of the swashplate 1 with respect to the rotation axis 1a, as is generally known in the art of hydraulics. For example, in the neutral position of the swashplate 1 illustrated in FIG. 1a in which the flat surface 1b of the swashplate 1 is arranged perpendicular to the vertical axis 6, i. e perpendicular to the axis of rotation of the hydraulic unit, the swashplate 1 sets the stroke of the pistons and the hydraulic displacement of the hydraulic unit to zero.

A race 5a fixed or connected to the housing 5 has an arcuate concave surface 5b. In the figures, the arcuate concave surface 5b is hidden from view by a flange portion of the race Sa. The arcuate concave surface 5b of the race 5a has the shape of a section of a cylinder barrell whose symmetry axis coincides with the rotation axis 1a of the swashplate 1. It is understood that in alternative embodiments not explicitly depicted here the race 5a may be formed in one piece with the housing 5.

The swashplate bearing 2 is disposed in between the arcuate concave surface 5b of the race 5a and the arcuate convex surface 1c of the swashplate 1. The swashplate bearing 2 is movable relative to the swashplate 1 and relative to the housing 5. More specifically, the coupling member 4 limits movement of the swashplate bearing 2 relative to the swashplate 1 and relative to the housing 5, as will be explained in more detail below. Here, the swashplate bearing 2 is configured as a semi cradle bearing. The swashplate bearing 2 includes an arcuate shaped cradle bearing cage 2a and a plurality of rollers 2b mounted on the cage 2a. The cage 2a includes two flange portions 2c which enclose the rollers 2b along the rotation axis 1a of the swashplate 1. In the figures, one of the two flange portions 2c is hidden from view. The arcuate shaped concave surface 5b of the race 5a connected to or formed in one piece with the housing 5 forms a cradle bearing seat for the swashplate cradle bearing 2.

Here, the rollers 2b each have a cylindrical shape. A cylinder axis of each of the rollers 2b is arranged in parallel to the rotation axis 1a of the swashplate 1. However, it is conceivable that in alternative embodiments the rollers 2b may have spherical shapes, for example. Further, in the embodiments depicted here, all of the rollers 2b mounted on the cage 2a of the swashplate bearing 2 may be disposed at equal distances from one another. For instance, with respect to the swashplate bearing shown in WO 2019/158528 A1, the swashplate bearing 2 disclosed herein and shown in the figures may include at least one additional roller 2b. In this way, the swashplate bearing 2 disclosed herein may carry a higher maximum load. Further, mechanical wear of the swashplate bearing 2 may be reduced and its service life may be increased. For ease of illustration, only some of the rollers 2b shown in the figures are designated with reference signs. The rollers 2b can be most clearly identified in FIG. 1b.

The cage 2a of the swashplate bearing 2 further includes a portion 2d. Here, the portion 2d has the shape of a stud or gudgeon and extends or protrudes from one of the flange portions 2c of the cage 2a in parallel to the axis of rotation 1a of the swashplate 1. In the embodiments depicted in the figures, the flange portion 2c of the cage 2a features a clearance 2e enclosed by edge portions 2c', 2c", and the portion 2d is disposed within said clearance 2e, for example halfway in between the edge portions 2c', 2c".

The pin 3 extends in parallel to the rotation axis 1a of the swashplate 1. In the embodiments depicted in the figures, the pin 3 may be partially received in a boring formed in the swashplate 1. For example, the pin 3 may be connected to the swashplate 1 via a threaded connection or via a press-fit. However, it is understood that in alternative embodiments not explicitly depicted here the pin 3 and the swashplate 1 may be connected in other ways, or that the pin 3 may be formed in one piece with the swashplate 1. In the coupling assembly 100 shown in FIGS. 1a-e, the pin 3 is disposed on or at the symmetry plane 1d of the swashplate 1.

In the embodiments depicted in the figures, the coupling member 4 comprises or is formed of a wire, for example a metal wire. For example, the coupling member 4 may be formed of a single wire strand. It is understood that in alternative embodiments the coupling member 4 may be made of or may comprise other materials such as plastic, fiber glass, or the like. For example, in alternative embodiments the coupling member 4 may be formed of a wire comprising materials such as plastic, fiber glass, or the like. The coupling member 4 extends from a first end 4a to a second end 4b. The coupling member 4 includes a bent portion 4c which is rotatably supported or rotatably mounted on the pin 3. Here, the bent portion 4c is formed at the first end 4a of the coupling member 4. More specifically, the bent portion 4c includes or forms at least one first loop 4d enclosing the pin 3. For example, the at least one first loop 4d may be wound or coiled around the pin 3 one or more times. In other words, the coupling member 4 is connected to the pin 3 in a form-fit or positive fit so that the coupling member 4 is translationally fixed to the pin 3. Yet more specifically, the at least one first loop 4d translationally fixes the coupling member 4 to the pin 3 in a plane perpendicular to the rotation axis 1a of the swashplate 1.

Figure 1B:
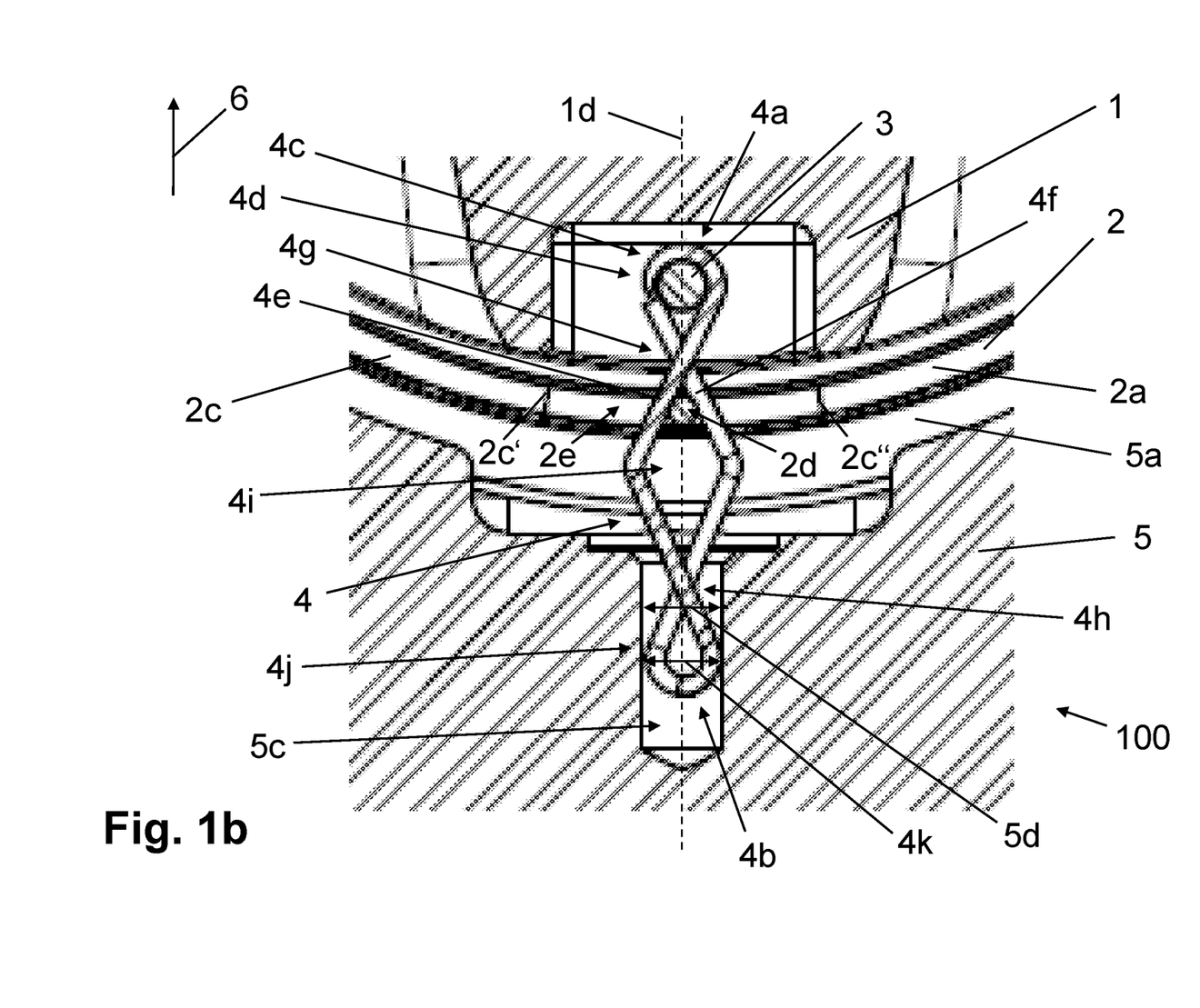
Figure 1C:
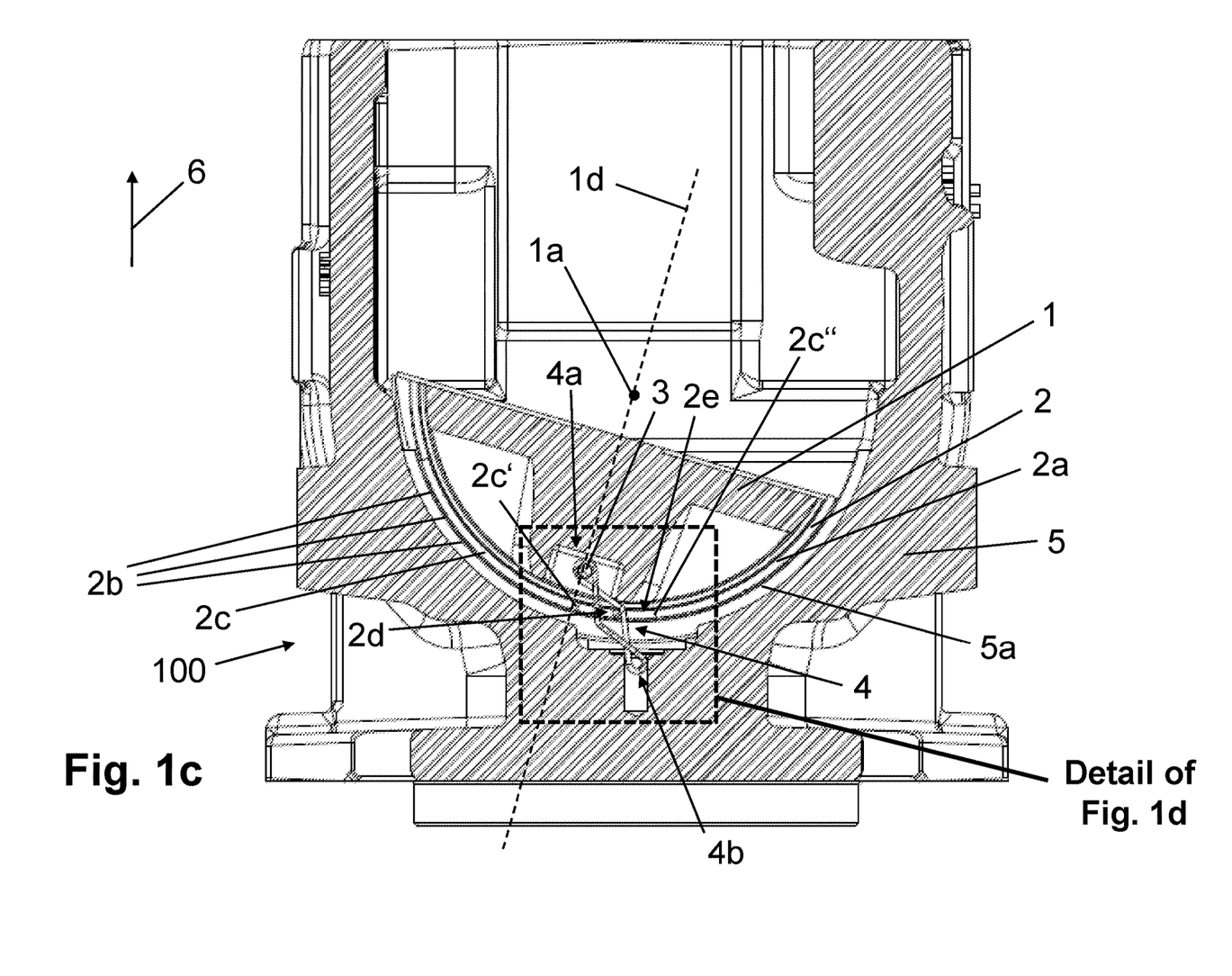
Figure 1D:
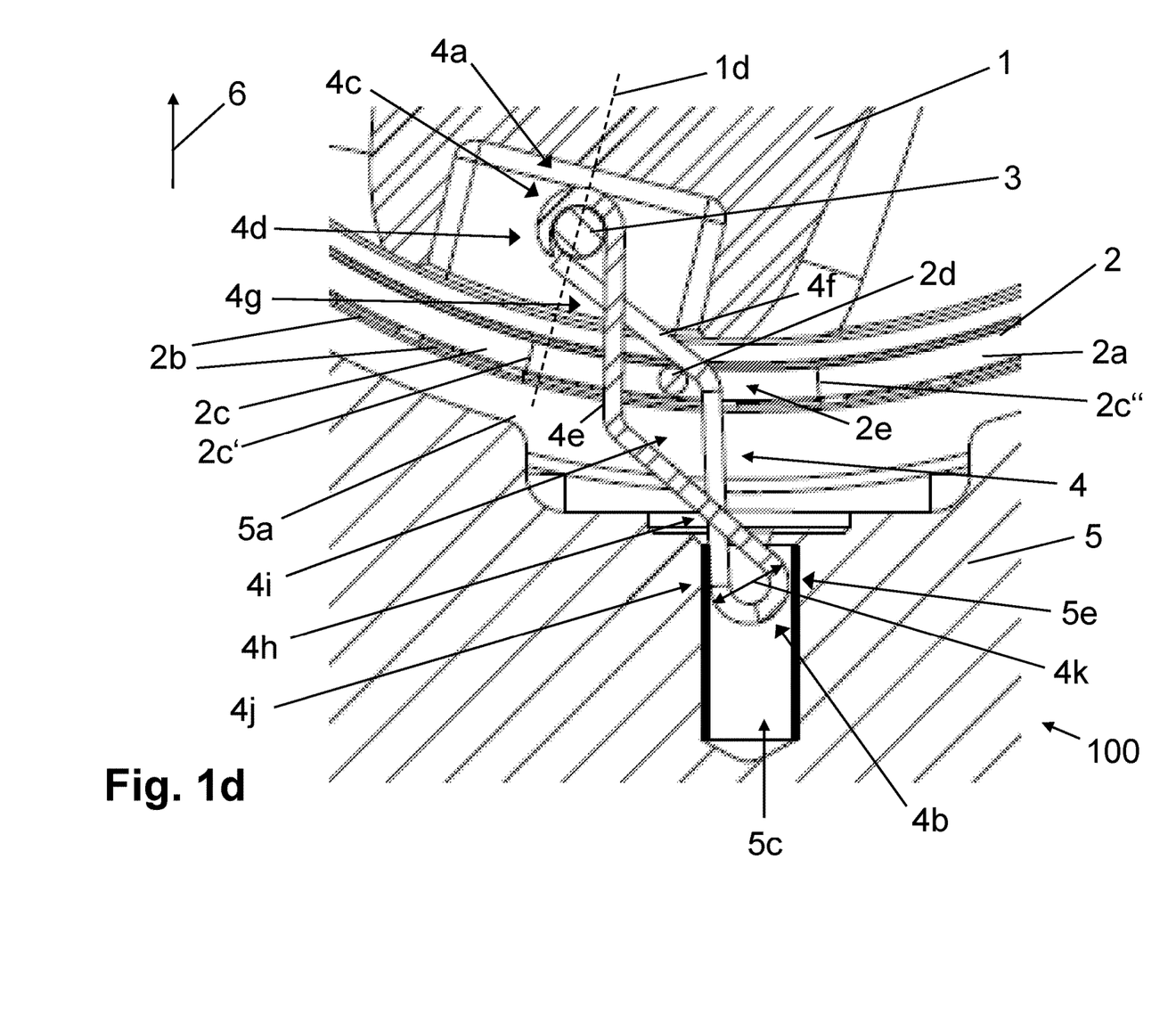
Figure 1E:
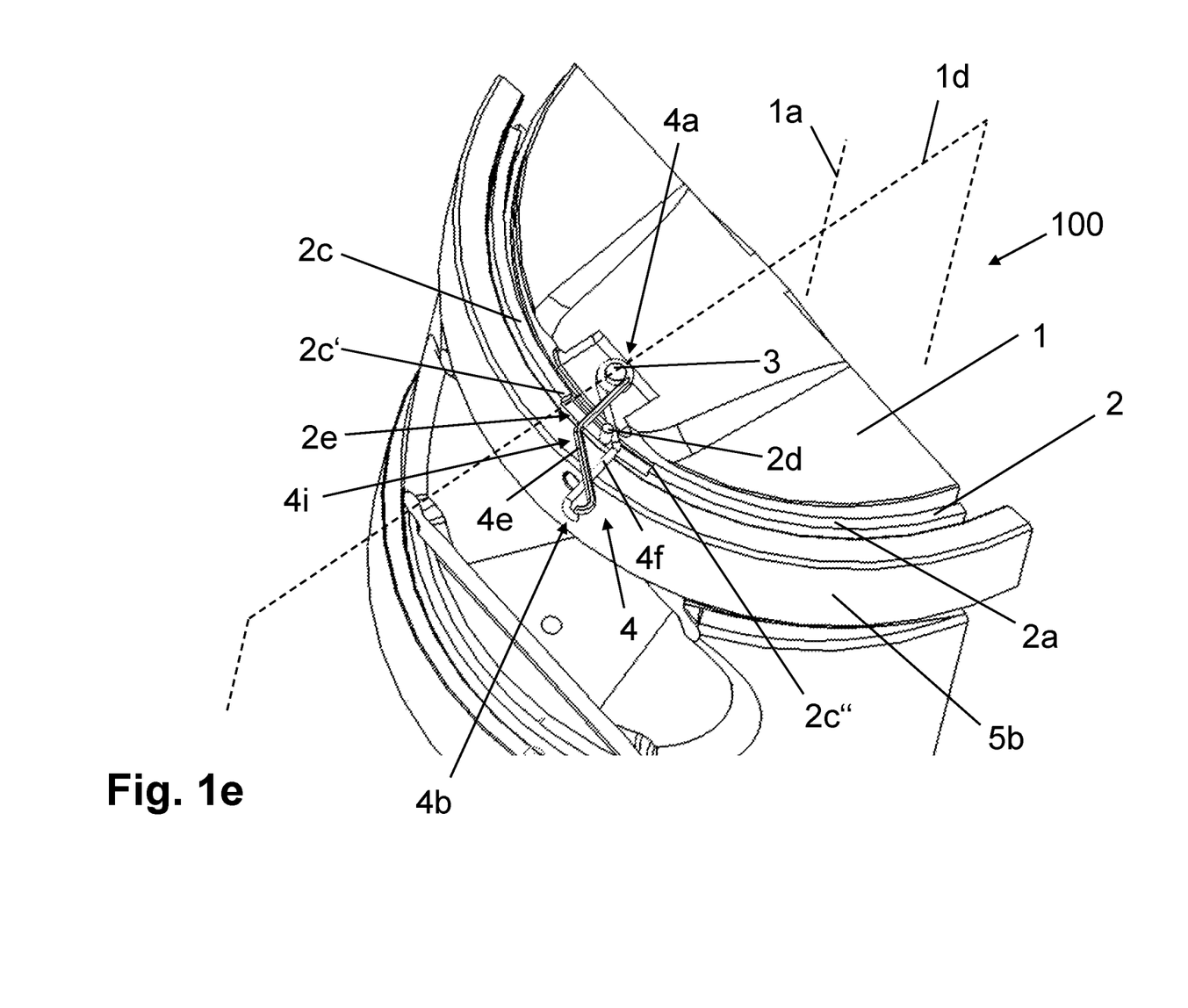

The wire forming the coupling member 4 includes two legs 4e, 4f (see FIGS. 1b, 1d, 1e). The two legs 4e, 4f extend from the bent portion 4c of the wire and towards the second end 4b of the coupling member 4. The two legs 4e, 4f span or extend in a plane perpendicular to the rotation axis 1a of the swashplate 1. In the embodiments depicted in the figures, the two legs 4e, 4f cross each other at a first crossing point 4g disposed in between the first end 4a and the second end 4b of the coupling member 4. Here, the two legs 4e, 4f further cross each other at a second crossing point 4h disposed in between the first crossing point 4g and the second end 4b of the coupling member 4. In between the first crossing point 4g and the second crossing point 4h, the two legs 4e, 4f form an eye 4i. Here, the coupling member 4 is arranged such that the portion 2d of the cage 2a is disposed in between the two legs 4e, 4f of the coupling member 4. More specifically, the portion 2d of the cage 2a is disposed within the eye 4i formed by the two legs 4e, 4f.

In the embodiments depicted here, the wire constituting the coupling member 4 forms a second loop 4j disposed in between the second crossing point 4h and the second end 4b of the coupling member 4 (see FIGS. 1b, 1d). The second end 4b of the coupling member 4 is received or slidably received in a recess or cutout 5c formed in the housing 5. More specifically, the second loop 4j formed at the second end 4b of the coupling member 4 is received in the recess or cutout 5c formed in the housing 5. In a plane perpendicular to the axis of rotation 1a of the swashplate 1, the recess or cutout 5c may have a rectangular cross section, for example. Here, the recess or cutout 5c is a boring extending in the vertical direction 6.

The second loop 4j has an at least partially round or oval shape. Consequently, along an axis connecting the first end 4a and the second end 4b of the coupling member 4, a width 4k of the coupling member 4 perpendicular to said axis and perpendicular to the rotation axis 1a of the swashplate 1 decreases at least in a section along said axis connecting the two ends 4a, 4b, for example in a section extending between the second end 4b and the second crossing point 4h of the coupling member 4 (see FIG. 1d). As will be apparent from the following description of the functioning of the coupling assembly 100, this shape of the portion of the coupling member 4 received in the recess or cutout 5c facilitates movement of the coupling member 4 out of and into the recess or cutout 5c as the swashplate is rotated between the neutral position shown in FIG. 1a and the tilted position shown in FIGS. 1c and 1d.

In the neutral position of the swashplate 1 shown in FIGS. 1a and 1b, the symmetry plane 1d of the swashplate 1 is aligned with the vertical direction 6 and with the vertically extending recess 5c formed in the housing 5. The coupling member 4 extends in the vertical direction 6 and is partially received in the recess 5c. More specifically, the second loop 4j and the second crossing point 4h formed by the legs 4e, 4f of the coupling member 4 are fully received in the recess 5c. Here, the portion 2d extending from the flange portion 2c of the cage 2a of the swashplate bearing 2 in parallel to the rotation axis 1a of the swashplate 1 is in contact with the coupling member 4. More specifically, the portion 2d disposed within the eye 4i formed by the legs 4e, 4f of the wire forming the coupling member 4 contacts or abuts both legs 4e, 4f. A maximum width 4k of the portion of the coupling member 4 received in the recess 5c corresponds to or is just slightly smaller than the minimum width 5d of the recess 5c, wherein the widths 4k and 5d are determined perpendicular to the vertical direction 6 and perpendicular to the rotation axis 1a of the swashplate 1.

As the swashplate 1 is now rotated or tilted with respect to the rotation axis 1a in order to increase the displacement of the hydraulic unit in which the coupling assembly 100 is disposed, as shown in FIGS. 1c and 1d, the pin 3 rotates with the swashplate 1. In FIGS. 1c and 1d, the swashplate 1 is rotated or tilted towards the left with respect to the vertical direction 6. As the coupling member 4 is rotatably and translationally fixed to the pin 3, the pin 3 rotating with the swashplate 1 partially lifts the coupling member 4 out of the recess 5c and tilts the coupling member 4 with respect to the vertical direction 6. In FIGS. 1c and 1d, the pin 3 tilts the coupling member 4 towards the left with respect to the vertical direction 6. Concurrently, a portion of the coupling member 4 is supported on a portion of the housing 5. In FIGS. 1c and 1d, a portion of the second loop 4j formed by the legs 4e, 4f of the coupling member 4 is supported on a vertically extending portion 5e of the housing 5 enclosing the recess 5c. Thus, a portion of the coupling member 4, here the right leg 4f of the wire forming the coupling member 4, pushes the portion 2d of the cage 2a and moves or rotates the swashplate bearing 2 in the same direction as the swashplate 1, i. e. towards the left in FIGS. 1c and 1d. In this way, the coupling member 4 adjusts or corrects the position of the swashplate bearing 2 relative to the swashplate 1 as the swashplate 1 is rotated with respect to the rotation axis 1a. For example, in the embodiment shown in FIGS. 1a-1e, as the swashplate 1 is rotated by an angle α relative to the vertical direction 6, the coupling member 4 rotates the swashplate bearing 2 at least by an angle α/2 in the same direction.

Figure 2A:
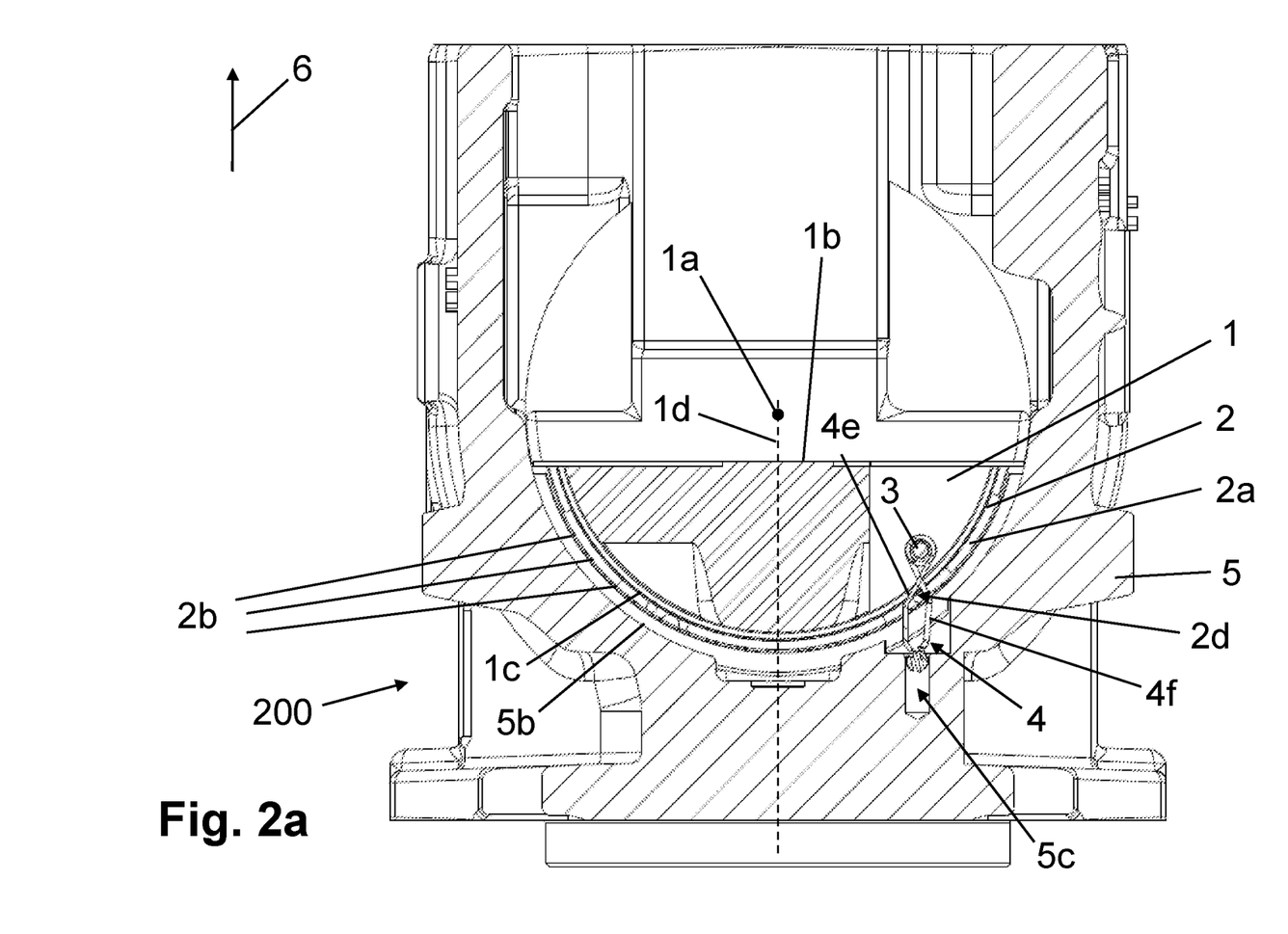
Figure 2B:
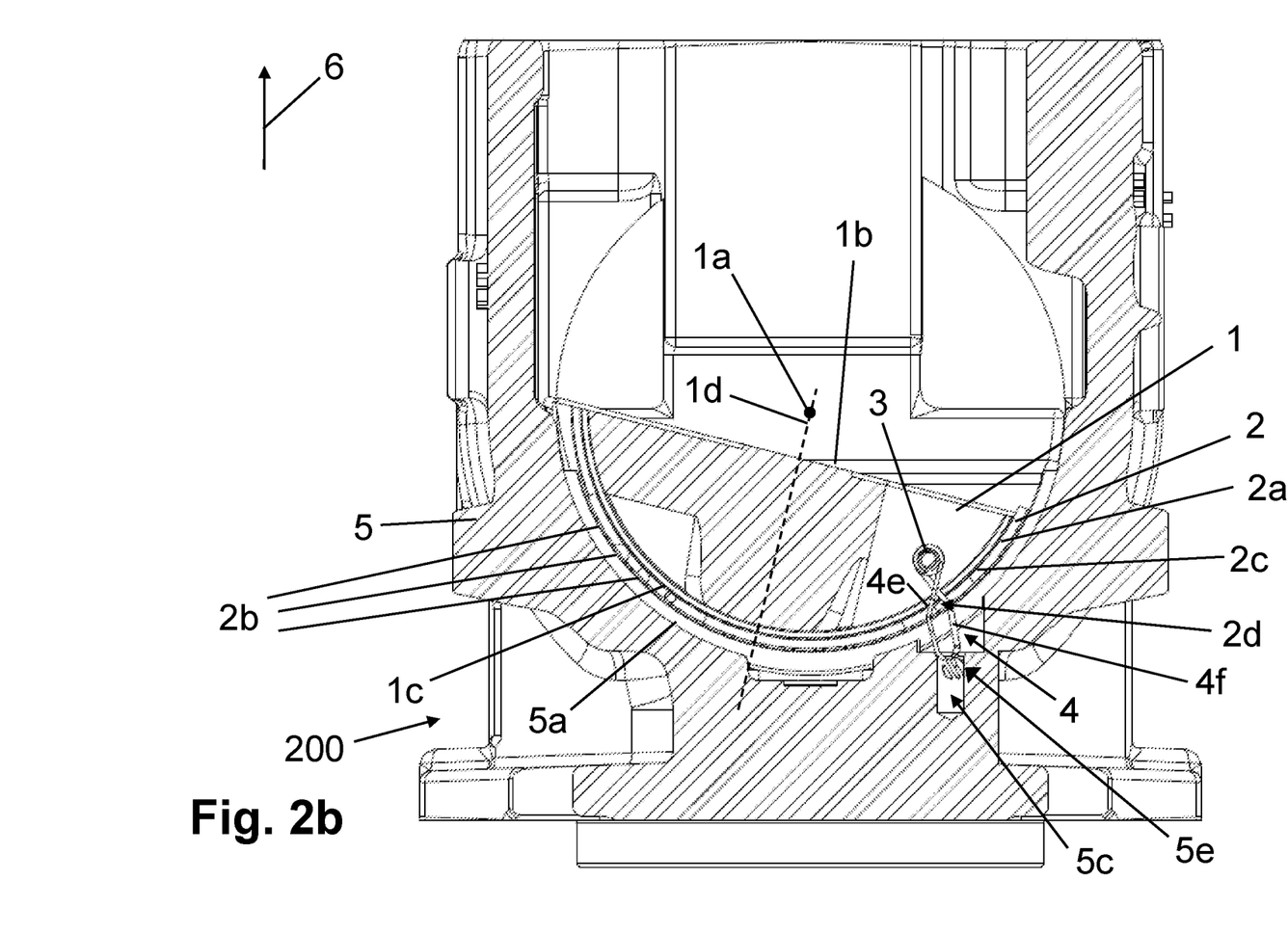

The coupling assembly 200 for a hydraulic unit illustrated in FIGS. 2a and 2b is a variant of the coupling assembly 100 shown in FIGS. 1a-e. For the sake of brevity and simplicity, only those features which distinguish the coupling assembly 200 of FIGS. 2a, 2b from the coupling assembly 100 of FIGS. 1a-e will be described in some detail. As before, features recurring in different figures are depicted with the same reference signs.

In contrast to the coupling assembly 100 of FIGS. 1a-e, in the coupling assembly 200 of FIGS. 2a, 2b the pin 3 is disposed or located at a distance from the symmetry plane 1d of the swashplate 1. For example, in FIGS. 2a, 2b the pin 3 is disposed at a distance from the symmetry plane 1d of the swashplate 1 which corresponds to approximately one half of a distance between the arcuate convex surface 1c and the rotation axis 1a of the swashplate 1. It is understood that in other embodiments the the pin 3 may be disposed at greater or at a smaller distance from the symmetry plane 1d of the swashplate 1. And further in contrast to the coupling assembly 100 of FIGS. 1a-e, in the coupling assembly 200 of FIGS. 2a, 2b the vertically extending recess 5c formed in the housing 5 is not aligned with the symmetry plane 1d of the swashplate 1 when the swashplate 1 is in the neutral position, as shown in FIG. 2a. Finally, as opposed to the coupling assembly 100 of FIGS. 1a-e, in the coupling assembly 200 of FIGS. 2a, 2b the coupling member 4 is moved further into the recess 5c as the swashplate 1 is rotated from the neutral position shown in FIG. 2a toward the tilted position shown in FIG. 2b. However, a person of ordinary skill readily understands that apart from these differences the functionality of the coupling assembly 200 of FIGS. 2a, 2b is analogous to the functionality of the coupling assembly 100 of FIGS. 1a-e.

Although in the variants of the coupling assembly specifically disclosed herein the portion 2d of the cage 2a which the coupling member 4 is configured to contact in order to move or rotate the swashplate bearing 2 upon rotation of the swashplate 1 is disposed in between the two legs 4e, 4f of the coupling member 4, or, more specifically, within the eye 4i formed by the legs 4e, 4f, it is understood that in alternative embodiments not explicitly depicted here the coupling member 4 may contact the cage 2a at another portion in order to move or rotate the swashplate bearing 2 upon rotation of the swashplate 1. From FIG. 1d, for example, it is apparent that in embodiments where the cage 2a does not include the stud-like portion 2d, but, instead, the clearance 2e formed in the flange portion 2c of the cage 2a is shorter along the arcuate extension of the flange portion 2c than in the embodiments explicitly described herein, the coupling member 4 may still be configured to move or rotate the swashplate bearing 2 upon rotation of the swashplate 1 in much the same manner, for instance by contacting or pushing one of the edge portion 2c' of the cage 2a.

Further, it is understood that the presently proposed coupling assembly may function in much the same or in an analogous manner when the coupling member has a form, shape or geometry which differs from the form, shape or geometry of the coupling member 4 specifically disclosed herein.

The invention claimed is:

1. Coupling assembly for a variable displacement hydraulic unit, the coupling assembly comprising a rotatable swashplate, a swashplate bearing including a cage and a plurality of rollers mounted on the cage, a pin fixed to the swashplate, and a coupling member rotatably supported on the pin, wherein the coupling member is configured to contact a portion of the cage to move the swashplate bearing upon rotation of the swashplate,
   wherein the coupling member includes a wire;
   wherein the wire includes a bent portion which is rotatably supported on the pin,
   wherein the coupling member has a first end including the bent portion of the wire and a second end, the wire forming two legs extending from the bent portion towards the second end of the coupling member,
   wherein the two legs cross each other at least at a first crossing point disposed between the first end of the coupling member and the second end of the coupling member.

2. The coupling assembly of claim 1, wherein the coupling member is translationally fixed to the pin.

3. The coupling assembly of claim 1, further including a housing, wherein the swashplate bearing rotatably supports the swashplate on the housing and wherein a portion of the coupling member is configured to be supported on a portion of the housing for moving the swashplate bearing upon rotation of the swashplate.

4. The coupling assembly of claim 1, wherein the pin extends in parallel to a rotation axis of the swashplate.

5. The coupling assembly of claim 1, wherein the pin is disposed within a symmetry plane of the swashplate.

6. The coupling assembly of claim 1, wherein the pin is disposed at a distance from a symmetry plane of the swashplate.

7. The coupling assembly of claim 1, wherein the wire is made of metal.

8. The coupling assembly of claim 1, wherein the bent portion of the wire includes a first loop formed by the wire and enclosing the pin.

9. The coupling assembly of claim 1, wherein the portion of the cage which the coupling member is configured to contact to move the swashplate bearing upon rotation of the swashplate is disposed in between the two legs of the wire.

10. The coupling assembly of claim 1, wherein the two legs form an eye disposed in between the first crossing point and the second end of the coupling member.

11. The coupling assembly of claim 10, wherein the portion of the cage which the coupling member is configured to contact to move the swashplate bearing upon rotation of the swashplate is received within the eye formed by the two legs.

12. The coupling assembly of claim 1, wherein all of the rollers mounted on the cage are disposed at equal distances from one another.

13. The coupling assembly of claim 1, wherein the swashplate bearing is a semi cradle bearing.

* * * * *